United States Patent [19]

Szirtes

[11] Patent Number: 5,319,905

[45] Date of Patent: Jun. 14, 1994

[54] PANEL ARRAY DEPLOYMENT APPARATUS

[75] Inventor: Thomas Szirtes, Willowdale, Canada

[73] Assignee: Spar Aerospace Limited, Brampton, Canada

[21] Appl. No.: 951,872

[22] Filed: Sep. 28, 1992

[51] Int. Cl.⁵ .................................................. E04H 12/18
[52] U.S. Cl. .................................... 52/108; 52/71; 244/173; 160/213; 160/233
[58] Field of Search ............ 52/108, 639, 645, 71, 52/641, 646; 244/173, 158 R; 160/199, 206, 213, 233, 234

[56] References Cited

U.S. PATENT DOCUMENTS

| | | | |
|---|---|---|---|
| 3,525,483 | 8/1970 | Van Alstyne | 244/173 |
| 3,677,508 | 7/1972 | Dillard et al. | 52/108 |
| 4,015,653 | 4/1977 | Slysh et al. | 160/213 |
| 4,183,163 | 4/1979 | Chenin et al. | 244/173 |
| 4,561,614 | 12/1985 | Olikara et al. | 244/173 |
| 4,747,566 | 5/1988 | Kiendl | 244/173 |
| 4,880,188 | 11/1989 | Roth et al. | 244/173 |
| 4,936,367 | 6/1990 | Marello et al. | 244/173 |
| 5,037,043 | 8/1991 | Roth et al. | 244/173 |
| 5,098,042 | 3/1992 | Viale | 52/645 |

FOREIGN PATENT DOCUMENTS

| | | | |
|---|---|---|---|
| 3215432 | 10/1983 | Fed. Rep. of Germany | 244/173 |
| 0215000 | 1/1990 | Japan | 244/173 |

*Primary Examiner*—Carl D. Friedman
*Assistant Examiner*—Kien Nguyen

[57] ABSTRACT

Apparatus for deploying an articulated panel array comprises a spring motor between adjacent panels and a latch between adjacent panels. The latch between a given pair of panels is released by an abutment on the panel which is adjacent to the pair and toward the proximal end of the array only when the more proximally disposed panel of the pair moves to its fully deployed position. With this arrangement, only a single group of panels of the array moves at any given time providing an accurate deployment envelope.

7 Claims, 5 Drawing Sheets

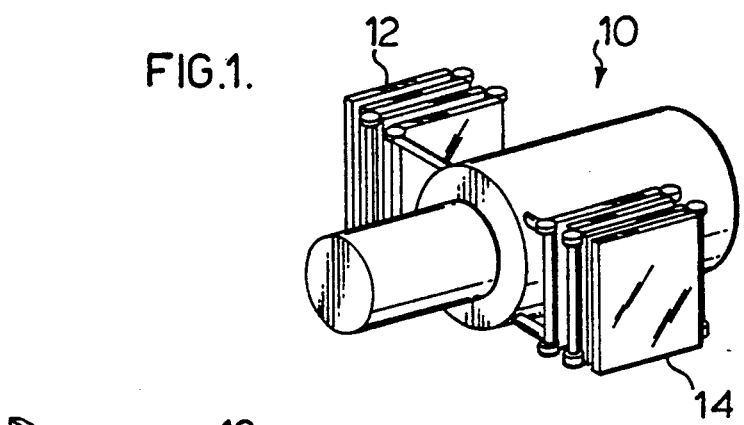
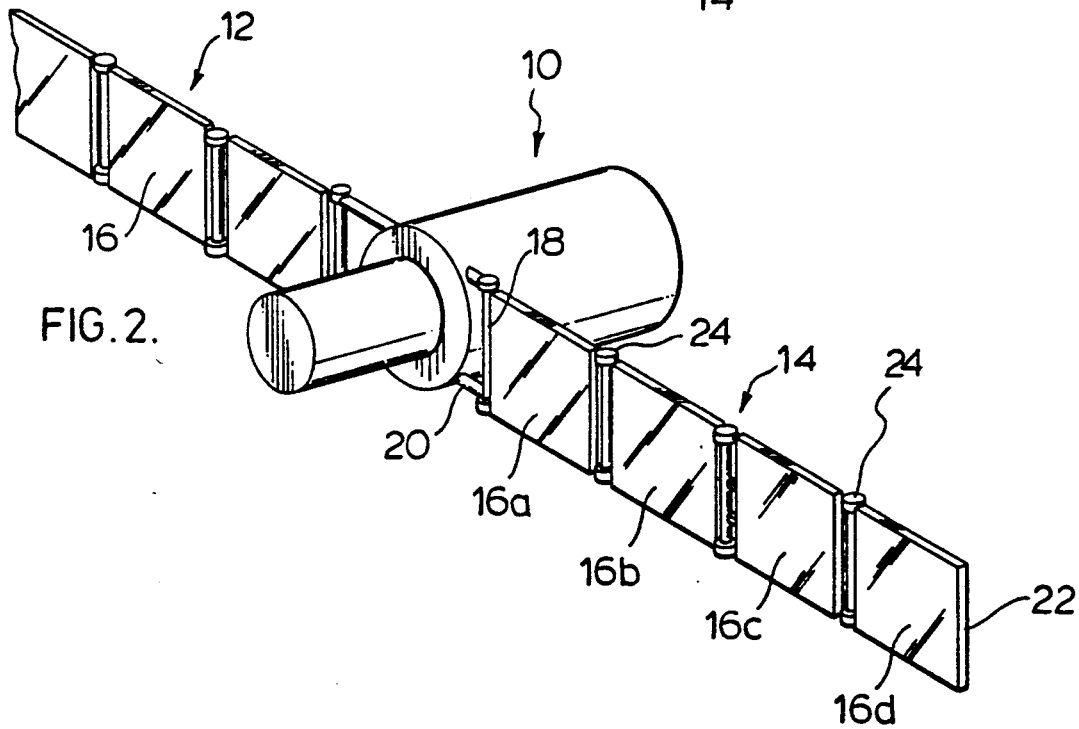

PANEL ARRAY DEPLOYMENT APPARATUS

BACKGROUND OF THE INVENTION

1. Field of the Invention

This invention relates to apparatus for deploying an articulated panel array.

2. Description of the Related Art

Heretofore, in deploying the panels of a satellite solar panel array, two basic approaches have been taken. Firstly, some deployment systems do not kinematically link neighbouring panels so that the panels deploy independently. With this approach, the deployment mechanism is mechanically relatively simple but the deployment trajectories of the elements are ill-defined. Hence, a great deal of uncertainty exists as to the transient geometry of the deploying array. This is disadvantageous as it risks the array knocking into other portions of the satellite during deployment.

The second approach used in deploying a satellite solar panel array kinematically links neighbouring panels with a coordinating device (comprising cables, pulleys or the like). While a coordinating device should provide a more defined deployment geometry, in practice, because of the finite stiffness of the coordinating linkage, sufficient divergence occurs between the theoretical and actual deployment envelopes as to potentially cause difficulties. Furthermore, the linkage mechanism of the coordinating device itself adds to the weight, cost and complexity of the satellite. Furthermore, the increased complexity reduces the overall reliability of the mechanical assembly.

The subject invention seeks to overcome drawbacks of known satellite solar panel array deployment apparatus by providing apparaus which offers a well-defined deployment trajectory while avoiding the use of coordinating linkages.

SUMMARY OF THE INVENTION

According to the present invention, there is provided apparatus for deploying an articulated panel array having a support end for mounting to a support and a distal end, of the array urging the panel of any articulated panel pair which is closer to said distal end to a deployed position with respect to the panel of the pair which is closer to said support end; a latch between each panel pair to retain the panel of the pair which is closer to said distal end in an undeployed position with respect to the panel of the pair which is closer to said support end; for any given panel pair other than the pair which is closest to said support end, a latch release associated with the panel next adjacent the given panel pair and toward said support end, said latch release releasing said latch between said given panel pair upon the panel of said panel pair which is closer to said support end moving to a deployed position with respect to said next adjacent panel; and controllable means to release the latch of the panel pair which is closest to said support end, whereby said panels are sequentially deployed once the latch of the panel pair which is closest to said support end is released.

BRIEF DESCRIPTION OF THE DRAWINGS

In the figures which disclose example embodiments of the invention,

FIG. 1 is a schematic perspective view illustrating a satellite equipped with a solar panel array deployment apparatus made in accordance with this invention, FIG. 2 is a schematic perspective view of the satellite of FIG. 1 showing the panel array in a deployed position.

DESCRIPTION OF THE PREFERRED EMBODIMENTS

Figure 4:
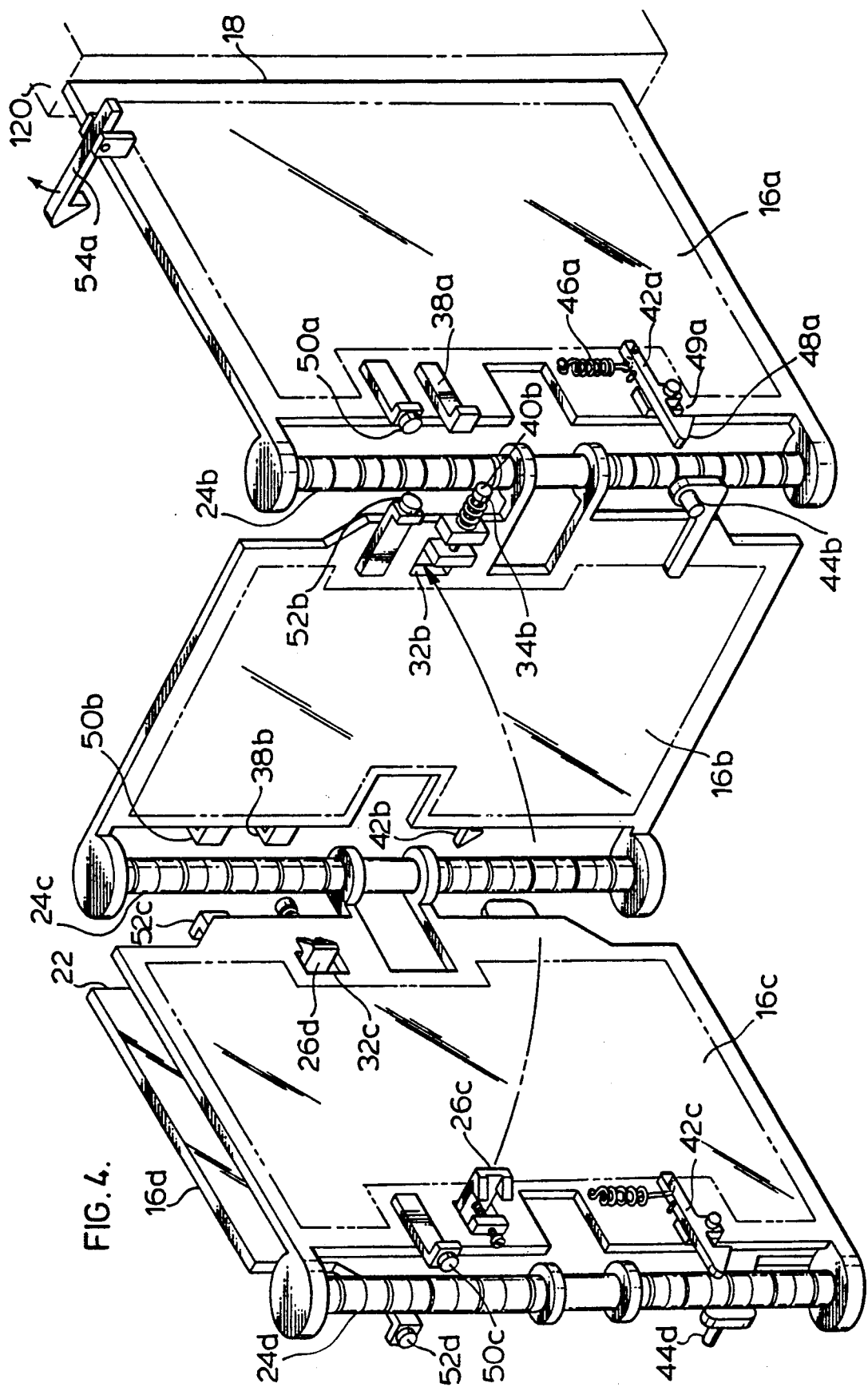
FIG. 4 is a perspective view of a solar panel array incorporating the deployment mechanism of this invention.
Figure 5:
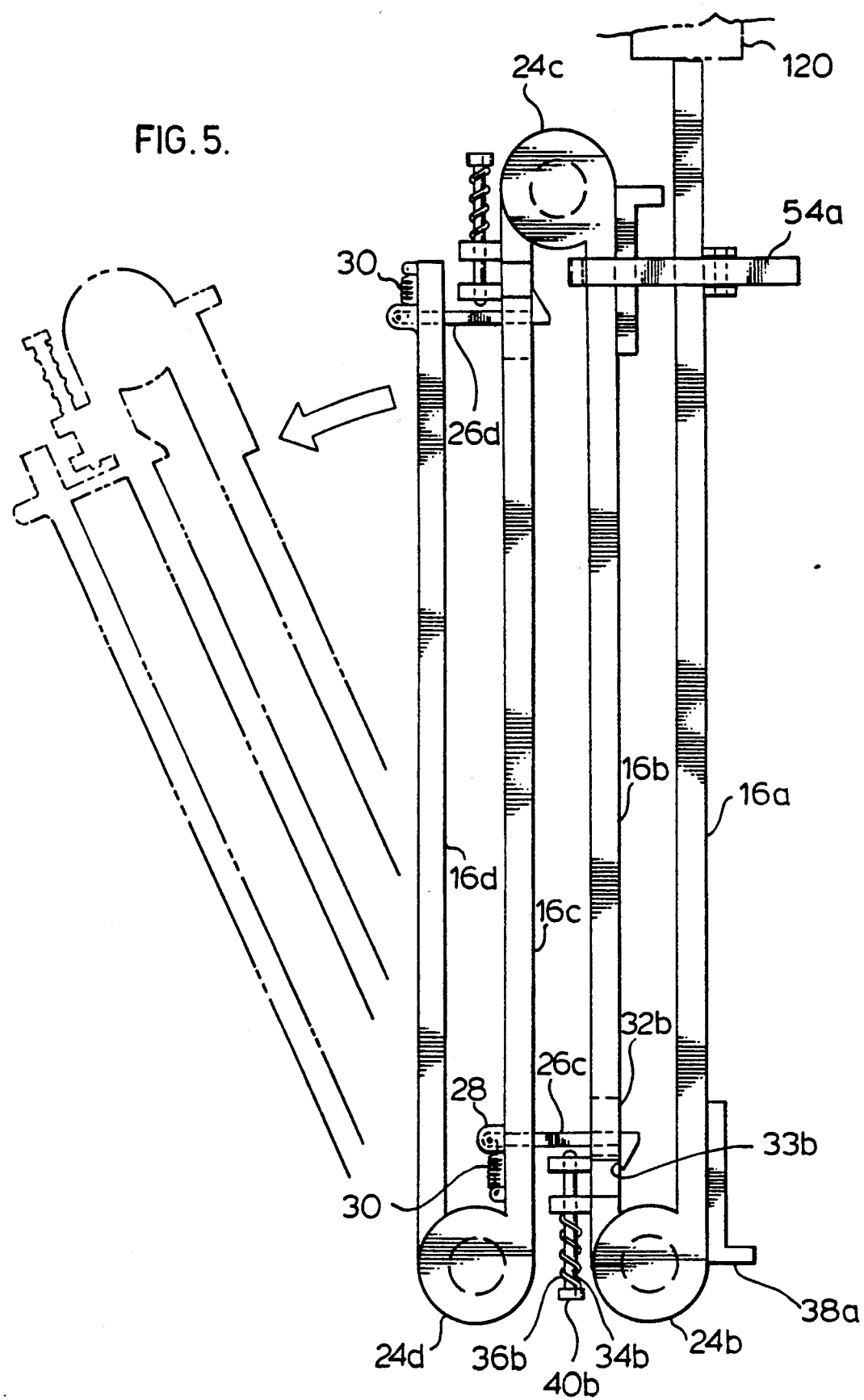
FIG. 5 is a plan view of a solar panel array equipped with the deployment mechanism of this invention.

With reference to FIG. 1, a satellite 10 has two solar panel arrays 12 and 14 depending therefrom. FIG. 1 illustrates the panel arrays in a stored position. FIG. 2 shows the same arrays 12 and 14 in a deployed position. Each array comprises a series of solar panels 16 which are hinged together by spring motors 24. Considering panel array 14, the proximal end 18 of the array is mounted on the support 20 which is part of the body of the satellite. This support may be a hinged support (as illustrated in FIG. 2 at 20) or a rigid support (as illustrated in FIGS. 4 and 5 at 120). The panel array also has a distal end 22 (FIG. 2).

Figure 3D:
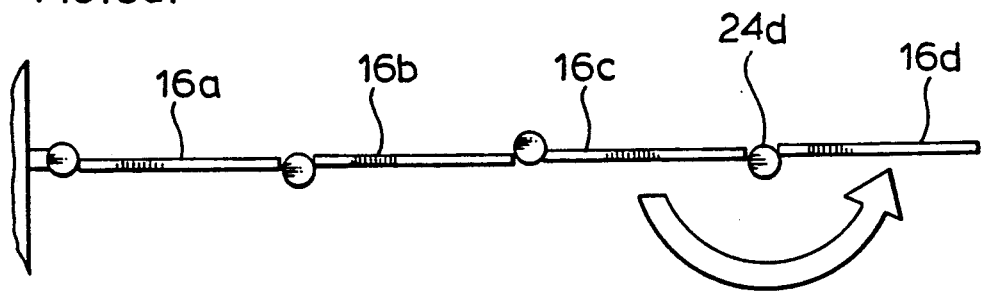
FIGS. 3a through 3d are schematic illustrations showing the operation of the solar panel deployment mechanism of this invention.

With reference to FIGS. 3a through 3d, as will become apparent hereinafter, the deployment mechanism of the subject invention allows for the automatic sequential deployment of the panels of the array. Thus, from the undeployed position illustrated in FIG. 3a, panel array 14 may be deployed with the group of panels sequentially unfolding from the most proximally disposed panel of the group (FIGS. 3b and 3c) until the most distally disposed panel 16d unfolds from the adjacent more proximally disposed panel 16c (FIG. 3d).

The details of the deployment mechanism of this invention are now described with reference to FIGS. 4 through 6. However, at the outset, it should be noted that during deployment, the panel array never attains the position illustrated in FIG. 4. The position of the array illustrated in FIG. 4 was chosen merely to clearly reveal the details of the structure of the array.

With reference to FIG. 4, spring motors 24b, 24c, and 24d are provided between each adjacent pair of panels 16a–16b, 16b–16c, and 16c–16d, respectively. The spring motors not only hingedly connect panel pairs but also provide the motive force for deploying the panels. The nature of the spring motors 24b, 24c, 24d is described in detail in U.S application Ser. No. 07/850,319 now U.S. Pat. No. 5,265,853, the disclosure of which is incorporated herein by reference.

Each spring motor is biased so that, considering any panel pair, the spring motor tends to urge the more distally disposed panel of the pair to a deployed position with respect to the more basely disposed panel of the pair.

With reference to FIG. 5 as well as FIG. 4 and considering panel pair 16b–16c, panel 16c has a hook 26c mounted thereto at pivot 28. The hook is biased to a latching position by a spring 30. The hook may be received within a receptor 32b in panel 16b and hook to panel 16b at flange 33b defining the edge of the receptor in order to retain panel 16c in an undeployed position with respect to panel 16b. Together, the hook and receptor act as a latch between panel pair 16b-16c. A similar latch (comprising hook 26d and receptor 32c) is associated with panel pair 16c-16d.

A plunger 34b is slidably supported on panel 16b so that it may be extended across the receptor 32b. The plunger is biased to an inoperative retracted position by spring 36b.

A latch release in the nature of abutment 38a is supported on panel 16a so that when panel 16b moves to a deployed position with respect to panel 16a, the abutment abuts the rear end 40b of plunger 34b and pushes the plunger to an operative extended position against the force of spring 36b. A similar latch release (comprising abutment 38b) is associated with panel 16b.

Figure 6A:
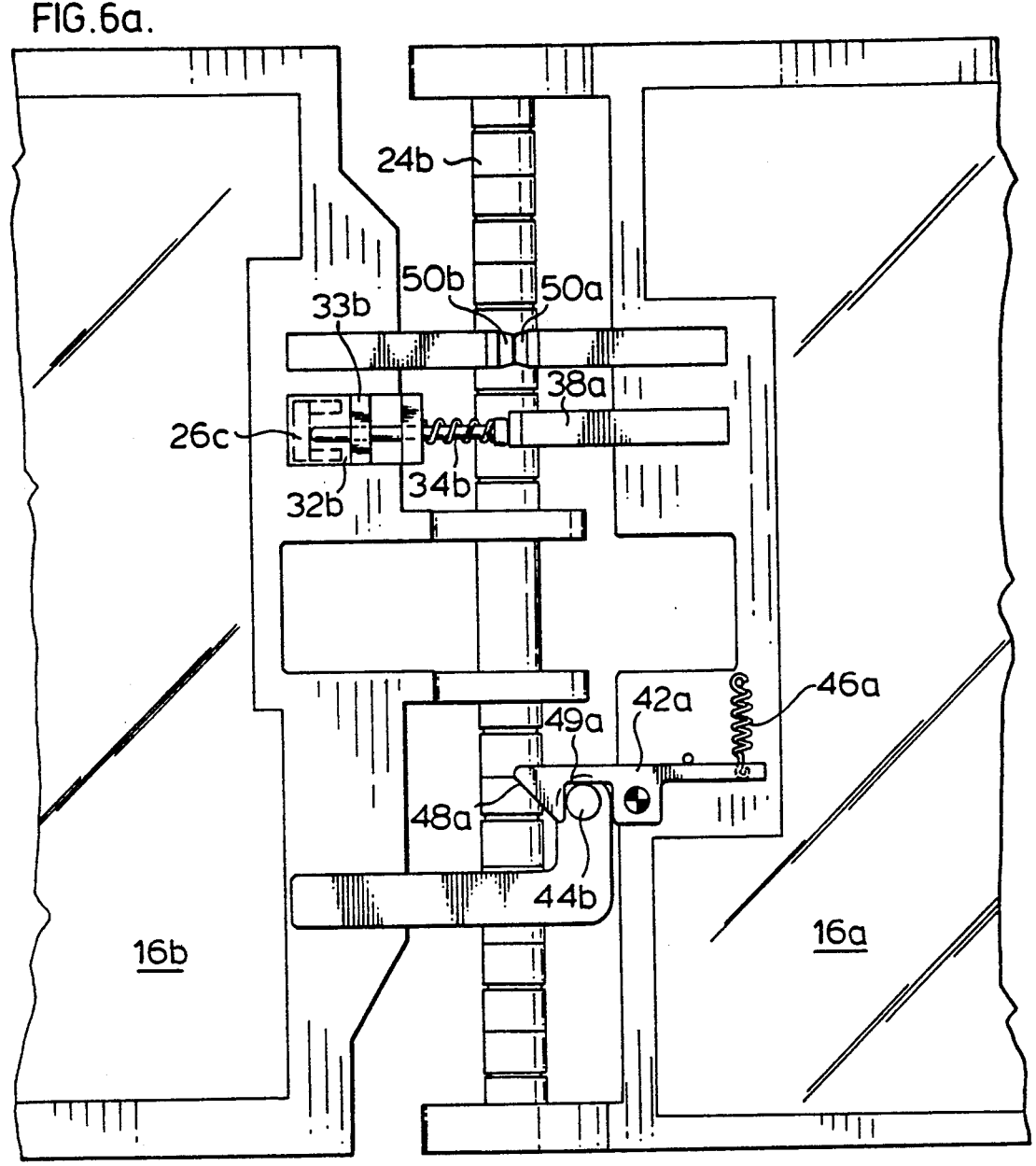
FIGS. 6 and 6a are side views of a portion of a solar panel array incorporating the deployment mechanism of this invention.
Figure 6:
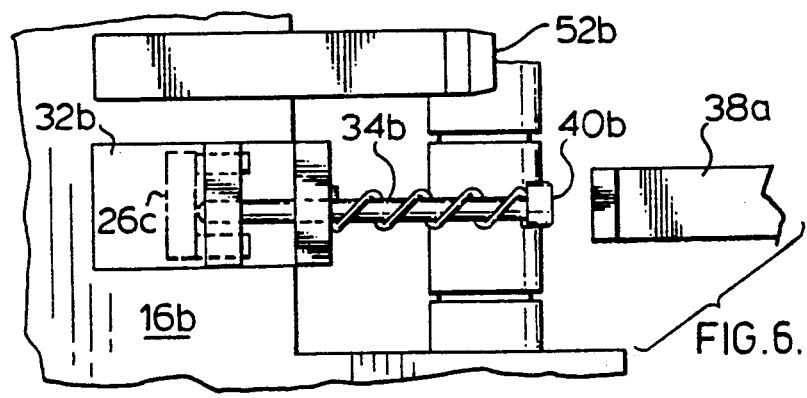

As seen in FIG. 4 and 6a, panel pair 16a-16b has a lock comprising a locking member 42a and a locking pin 44b. The locking member 42a is pivotally mounted to panel 16a and is spring biased by spring 46b to a locking position; in FIGS. 4 and 6a, the locking member is illustrated in this locking position. The locking member has a notch 49a and a ramp face 48a. The ramp face is in the path of pin 44b when the locking member 42a is in its locking position. Locking pin 44b is rigidly affixed to panel 16b. A similar lock is associated with each of the other panel pairs 16b-16c and 16c-16d.

Panel 16a also has an energy absorbing stop 50a mounted thereto and panel 16b has a similar energy absorbing stop 52b mounted thereto in the path of stop 50a such that the two stops abut as panel 16b moves to the deployed position with respect to panel 16a. Panel pair 16b-16c has similar stops 50b, 52c as does panel pair 16c-16d (stops 50c and 52d).

Panel 16a has an operator controlled latch 54a to hold panel 16b in an undeployed position with respect to panel 16a.

The operation of the apparatus of this invention will now be explained in connection with the FIGS. 5, 6, and 6a as well as figure series 3a through 3d. With the panel array in its undeployed position illustrated in FIG. 5 and (schematically) in FIG. 3a, operator controlled latch 54a may be moved to release panel 16b. Once this occurs, panel 16b begins to move toward its deployed position under the urging of spring motor 24b. However, because panel 16c is held in an undeployed position with respect to panel 16b by hook 26c and panel 16d is held in an undeployed position with respect to panel 16c by hook 26d, panels 16b through 16d rotate about the axis of spring motor 24b as a group. This is illustrated in phantom in FIG. 5. With reference to FIG. 6, as panel 16b nears its deployed position, abutment 38a approaches the head 40b of plunger 34b. When panel 16b reaches its deployed position, as illustrated in FIG. 6a, abutment 38a has pushed plunger 34b against hook 26c in order to disengage the hook from the flange 33b of the receptor 32b. This releases panel 16c from panel 16b so that panel 16c may begin to move a deployed position under the influence of spring motor 24c. It will be noted, however, that panel 16c will not begin to deploy until the moment when plunger 34b disengages hook 26c from the flange 33b of panel 16b.

Returning to a consideration of FIG. 6a, as panel 16b approaches its deployed position, pin 44b ramps up the ramp face 48a of locking member 42a. This displaces the locking member from its locking position allowing the pin to enter notch 49a of the locking member 42a whereupon the locking member is urged back to its locking position in order to retain pin 44b within notch 49a and hold panel 16b in its deployed position.

The act of pin 44b moving along ramp face 48a and displacing locking member 42a from its locking position against the urging of spring 46a absorbs some of the kinetic energy imparted to panel 16b by spring motor 24b. The remaining kinetic energy is absorbed by stops 50a and 50b which abut when panel 16b has moved to its fully deployed position with respect to panel 16a.

Figure 3C:
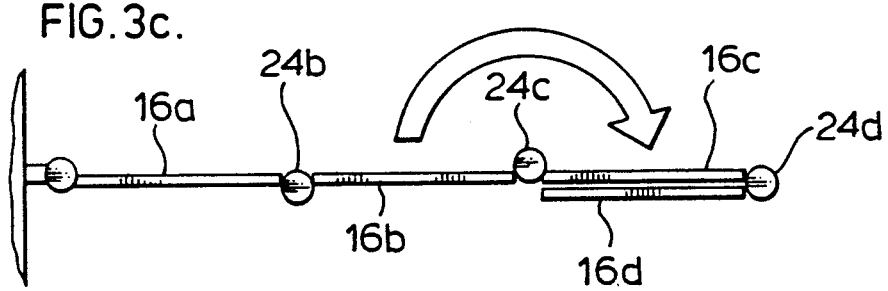
Figure 3B:
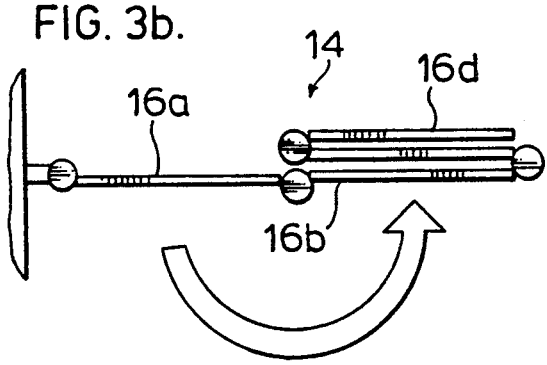
Figure 3A:
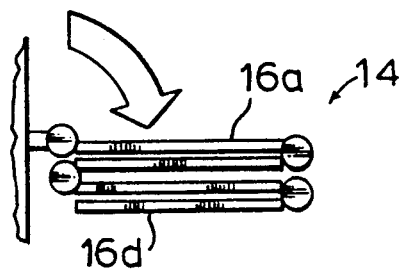

Once panel 16b has moved to its fully deployed position (FIG. 3b), the latch between panels 16b and 16c will be released and panel 16c will then move to its fully deployed position with respect to panel 16b (FIG. 3c). While panel 16c is rotating about the axis of spring motor 24c, panel 16d rotates with panel 16c by virtue of the latch between this panel pair. Finally, when panel 16c reaches its fully deployed position, the latch between panel pair 16c-16d is released and panel 16d moves to its fully deployed position with respect to panel 16c as seen in FIG. 3d. Accordingly, it will be apparent that the present invention provides a well-defined deployment envelope. Indeed, the only uncertainty in the envelope results from the finite stiffness of individual panel members. That is, individual members will flex slightly during deployment. However, this effect is extremely small.

Since during deployment, a group of panels moves together the energy to be absorbed by the structure at any given time is, at most, that imparted by one spring motor. Thus, the energy which must be dissipated is minimized. A further advantage of the system is that it minimizes deployment time. That is, because only one group of panels moves at a given time, the moment of inertia "seen" by the deploying spring motor is at a minimum because the deploying panels are the closest to the axis of rotation. Finally, because the deploying array of this invention has only one degree of freedom (that is, only one group of panels moves at a given time about a hinge line) the mechanism of the invention provides for easy analytical treatment.

Modifications will be apparent to those skilled in the art and, accordingly, the invention is defined in the claims.

What is claimed is:

1. Apparatus for deploying an articulated panel array having a support end for mounting to a support and a distal end, comprising:
   a spring motor between each adjacent pair of panels of the array urging the panel of any articulated panel pair which is closer to said distal end to a deployed position with respect to the panel of the pair which is closer to said support end;
   a latch between each panel pair to retain the panel of the pair which is closer to said distal end in an undeployed position with respect to the panel of the pair which is closer to said support end;
   for any given panel pair other than the pair which is closest to said support end, a latch release associated with the panel next adjacent the given panel pair and toward said support end, said latch release releasing said latch between said given panel par upon the panel of said panel pair which is closer to said support end moving to a deployed position with respect to said next adjacent panel; and
   controllable means to release the latch of the panel pair which is closest to said support end, whereby said panels are sequentially deployed once the latch of the panel pair which is closest to said support end is released.

2. The system of claim 1 wherein the latch between a panel pair comprises a hook pivotally attached to the panel of the panel pair which is closer to said distal end, said latch biased to a latching position for reception in a receptor of the panel of the panel pair which is closer to said support end.

3. The system of claim 2 wherein the latch release associated with the panel next adjacent a given panel pair and toward said support end comprises an abutment for causing the latch of the given panel pair to remove from a latching position to a release position.

4. The system of claim 3 further including, for each panel pair, a plunger associated with the panel of the panel pair which is closer to said support end, said plunger for sliding to an operative position in order to displace any hook within said receptor from a latching position to a release position and means to bias said plunger to an inoperative position and wherein the abutment associated with the panel next adjacent the given panel pair and toward said support end acts against said plunger to move said plunger to an operative position.

5. The system of claim 4 wherein said receptor includes a flange for hooking by said hook and wherein said plunger acts against said hook at a position which is between said flange and the pivot point for said hook.

6. The system of claim 3 including a lock between each panel pair to lock the panel which is closer to said distal end in a deployed position with respect to the panel which is closer to said support end.

7. The system of claim 6 wherein said lock comprises a locking member pivotally mounted to the panel of a panel pair which is closer to said support end, said locking member biased to a locking position and having a ramp face, said locking member also comprising a lock pin mounted to the panel of said panel pair which is closer to said distal end in the path of said ramp face when said panel closer to said distal end moves to a deployed position with respect to said panel closer to said support end whereby, during deployment of said panel closer to said distal end, said lock pin moves along said ramp face displacing said locking member thereby absorbing kinetic energy imparted to said panel closer to said distal end by the spring motor between the panel closer the distal end and panel closer to said support end and said lock pin is thereafter locked by said locking member.

* * * * *

UNITED STATES PATENT AND TRADEMARK OFFICE
CERTIFICATE OF CORRECTION

PATENT NO. : 5,319,905
DATED : June 14, 1994
INVENTOR(S) : Thomas Szirtes

It is certified that error appears in the above-identified patent and that said Letters Patent are hereby corrected as shown below:

column 5, line 14, delete "remove" and insert --move--.

Signed and Sealed this

Twentieth Day of September, 1994

Attest:

BRUCE LEHMAN

Attesting Officer

Commissioner of Patents and Trademarks